United States Patent Office 3,773,730
Patented Nov. 20, 1973

---

3,773,730
POLYMERS FROM OXAZOLIDINES AND UREA
Jerry Hoyt Hunsucker, Terre Haute, Ind., assignor to
Commercial Solvents Corporation
No Drawing. Original appplication May 12, 1970, Ser.
No. 36,679. Divided and this appplication Mar. 6, 1971,
Ser. No. 232,311
Int. Cl. C08g 22/02, 51/24
U.S. Cl. 260—77.5 C
3 Claims

ABSTRACT OF THE DISCLOSURE

Prepolymeric resinous compositions from an oxazolidine and urea or melamine and a lower aliphatic aldehyde. The resinous compositions polymerize on heating and have utility in baking enamels and in electro-deposition formulations to increase the solvent resistance of the film.

---

This is a division of application Ser. No. 36,679, filed May 12, 1970.

BACKGROUND OF THE INVENTION

This invention relates to polymeric substances. In a particular aspect, this invention relates to polymeric, resinous products useful in baking enamels and electro-deposition formulations.

Oxazolidines (including mono-oxazolidines and the bicyclo-azo-dioxo-octanes) have been known from the time of Senkus, J. Am. Chem. Soc., 67, 1515–1559 (1945). William B. Johnston, U.S. Pat. 2,448,890, disclosed reacting bicyclic oxazolidines with fatty acids to yield esters, which had the properties of drying oils.

Baking enamels applied by spraying and dipping are well known coating materials that are used in large quantities but the industry is ever in need of improvements in these compositions relative to improved flexibility, improved adhesion to metal substrates, resisting corrosion of the metal substrates, improved drying rate, as well as improvements in many of the other important properties.

Another class of coatings that have come into more recent widespread uses are electro-deposition resins wherein a substrate is immersed in an aqueous dispersion of the resin, an electric current is passed through the medium and the resin is deposited upon the substrate. The resinous coating is then baked to achieve the desired properties. These coatings have tended to suffer from some of the same disadvantages as the earlier baking enamels and consequently there exists a need for improving them.

SUMMARY OF THE INVENTION

It is an object of the present invention to provide new polymeric substances.

It is another object of this invention to provide polymeric resinous products useful in baking enamels and electro-deposition formulations.

Other objects will be apparent to those skilled in the art from the disclosure herein.

It has been discovered that improved baking enamels and formulations for electro-depositions are obtained by reacting 4,4-dimethyloxazolidine or a bicyclic oxazolidine corresponding to the formula

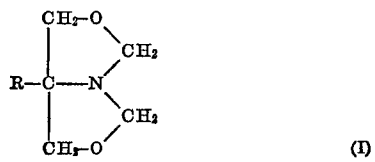

(I)

where R is hydrogen, alkyl, e.g. methyl or ethyl, or alkylol, e.g. hydroxymethyl with melamine and a lower aliphatic aldehyde or with urea, by mixing the ingredients and heating under reflux for a length of time sufficient to form the prepolymeric resinous compositions.

DETAILED DISCUSSION

The resinous composition of the present invention includes the condensation product of an oxazolidine corresponding to the foregoing Formula I with melamine and a lower aliphatic aldehyde or with urea. The condensation is effected by heating a mixture of the reactants at reflux temperature, i.e. at from about 95° C. to about 110° C., for about 1 to 3 hours.

In preparing the melamine-oxazolidine-formaldehyde resinous compositions, a mole ratio of about 1.5–2.5 moles of oxazolidine are used per mole of melamine, and about 1 to 2 moles of aldehyde are employed per mole of melamine. The reaction is conducted in the presence of a lower alkyl alcohol having from 1 to 4 carbon atoms.

In preparing the urea-oxazolidine resinous composition, a mole ratio of about 1 of urea to from 1 to about 2 of oxazolidine is employed, preferably the ratio is about 1:2.

The resinous compositions of the present invention are hard, clear, colorless and solvent resistant when baked at a temperature and for a length of time suitable to effect complete polymerization, e.g. at about 350° F. for from 10 to 15 minutes, yet they are not brittle. They are suitable for use as the vehicle in baking enamels and paper coatings. They can be readily dispersed in water with suitable dispersing agents, many of which are known, and are especially useful in coatings applied by electro-deposition.

The oxazolidines used in the practice of this invention are commercially available and the usual commercial materials are suitable. 4,4-dimethyloxazolidine is generally known as Oxazolidine A and this designation is employed in the examples. The bicyclic oxazolidine wherein R is ethyl is known as Oxazolidine E and this designation is used in the examples. The bicyclic oxazolidine wherein R is hydroxymethyl is known as Oxazolidine T and this designation is used in the examples.

Aliphatic aldehydes useful in preparing the composition include the lower aliphatic aldehydes of from 1 to 4 carbon atoms, e.g. formaldehyde, acetaldehyde, propionaldehyde, and n- and iso-butyraldehyde. These materials are commercially available and the usual commercial materials are suitable.

The melamine and urea used in the practice of this invention are commercially available and the usual commercial materials are suitable.

The invention will be better understood with reference to the following examples. It is understood, however, that these examples are intended as illustrations only and are not to be considered as limiting the invention.

Example 1

A resin was formed by mixing the following ingredients in a reaction vessel equipped with a thermometer, stirrer, reflux condenser and take-off head:

|  | G. |
|---|---|
| Melamine (1 mole) | 126 |
| Oxazolidine E (1.5 mole) | 214 |
| Formaldehyde (162 g. of 37% aqueous solution, 2 mole) | 60 |
| 2-butanol | 210 |

The solution was heated to reflux temperature, about 94° C., for 2 hours. Water and some of the 2-butanol were then separated by distillation as the azeotrope (95 ml.) over a period of about 45 minutes. It was allowed to cool to room temperature and the properties were determined.

A wet film, 1.5 mil thick, was drawn down on a standard steel Q panel and was then baked. Properties of the solution and of the baked film are given in the table.

Example 2

The experiment of Example 1 was repeated except that the following ingredients were used:

|  | G. |
|---|---|
| Melamine (1 mole) | 126 |
| Oxazolidine E (2.5 moles) | 357 |
| Water | 200 |
| Formaldehyde (81 g. of 37% solution) | 30 |

Reflux temperature was about 140° C. and water was removed over a period of 1 hour after a previous 2 hour reaction period. A wet film of 1½ mil thickness was drawn down on a standard steel Q panel and was then baked. Properties of the solution and of the baked film are given in the table.

Example 3

The experiment of Example 1 is repeated except that Oxazolidine T is substituted for Oxazolidine E on an equimolar basis. The resulting resinous composition is useful in baked coatings.

Example 4

The experiment of Example 1 is repeated except that Oxazolidine A is substituted for Oxazolidine E on a 2:1 molar basis. The resulting resinous composition is useful in baked coatings.

Example 5

The experiment of Example 1 is repeated except that acetaldehyde is substituted for formaldehyde on an equimolar basis. The resulting resinous composition is useful in baked coatings.

Example 6

The experiment of Example 1 is repeated except that propionaldehyde is substituted for formaldehyde on an equi-molar basis. The resulting resinous composition is useful in baked coatings.

Example 7

The experiment of Example 1 is repeated except that n-butyraldehyde is substituted for formaldehyde on an equi-molar basis. The resulting resinous composition is useful in baked coatings.

Example 8

The experiment of Example 1 is repeated except that iso-butyraldehyde is substituted for formaldehyde on an equi-molar basis. The resulting resinous composition is useful in baked coatings.

Example 9

The experiment of Example 1 is repeated except that 2 moles of 4,4-dimethyloxazolidine is substituted for Oxazolidine E. The resulting resinous composition is useful in baked coatings.

Example 10

The experiment of Example 1 was repeated except that the following ingredients were used:

|  | G. |
|---|---|
| Urea (1 mole) | 60 |
| Oxazolidine E (1.9 moles) | 267 |
| Water | 100 |

The reflux period was 6 hours at about 160° C., after which 105 g. of water were removed in one hour. A wet film of 1.5 mil thickness was drawn down on a standard steel Q panel and was then baked. Properties of the solution and of the baked film are given in the table.

Example 11

The experiment of Example 1 is repeated except that the following ingredients were used:

|  | G. |
|---|---|
| Oxazolidine E (1.6 moles) | 230 |
| Urea (1 mole) | 60 |
| Water | 100 |

After reflux, 100 ml. of water were removed in about an hour. A 1.5 mil thickness wet film was drawn down on a standard steel Q panel and was then baked. Properties of the solution and of the baked film are given in the table. The coating of this example is especially useful as a paper coating.

Example 12

The experiment of Example 1 is repeated except that the following ingredients were used:

|  | G. |
|---|---|
| 4,4-dimethyloxazolidine (1.8 moles) | 178 |
| Urea (2 moles) | 60 |
| Water | 100 |

After heating at reflux, about 96° C., for 3 hours, 119 g. of water were removed in about an hour and a half. A wet film, 1.5 mil thick, was drawn down on a standard steel Q panel and then baked. Properties of the solution and of the baked film are given in the table.

Example 13

The experiment of Example 1 was repeated except that the following ingredients were used:

|  | G. |
|---|---|
| Oxazolidine T (1 mole) | 145 |
| Urea (0.5 mole) | 30 |
| Water | 100 |

After the reflux period (108° C.) 82 ml. of water were removed. A wet film, 1.5 mil thick, was drawn down on a standard steel Q panel and baked. Properties of the solution end of the baked film are given in the table. The baked film was highly resistant to ketone solvents.

TABLE.—SUMMARY OF RESULTS

| Example number | 1 | 2 | 10 | 11 | 12 | 13 |
|---|---|---|---|---|---|---|
| Properties of solution: | | | | | | |
| Color, Gardner | 1 | 2 | 2 | 1 | 1 | 5 |
| Viscosity, Gardner | J | O | T | U | X | X |
| Solids content, percent | 55+ | | | 72 | | |
| Baking temperature, °F | 350 | 350 | 350 | 220 | 220 | 220 |
| Baking time, minutes | 10 | 15 | 15 | 10 | 10 | 10 |
| Properties of film: | | | | | | |
| Film hardness | 6H | 6H | 6H | 6H | 6H | 6H |
| Flexibility, passes (inch) | ⅛ | | ⅛ | ⅛ | | ⅛ |
| Reverse impact, lb | | <10 | | 80+ | 80+ | |

I claim:

1. A prepolymer resinous composition consisting essentially of the condensation product obtained by reacting 4,4-dimethyloxazolidine or an oxazolidine corresponding to the formula

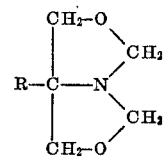

where R is hydrogen, alkyl or alkylol with urea in a mole ratio of 1–2:1 at a temperature of from about 95° C. to about 110° C., for about 1 to 3 hours.

2. The composition of claim 1 wherein the oxazolidine is 4,4-dimethyloxazolidine.

3. The composition of claim 1 wherein said oxazolidine corresponds to the formula

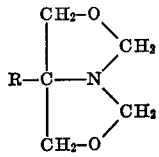

(I)

where R is hydrogen, alkyl or alkylol.

References Cited

UNITED STATES PATENTS

| 2,352,152 | 6/1944 | Kaplan | 260—307 F |
| 2,443,062 | 6/1948 | Abramovitch | 260—307 F |
| 3,266,970 | 8/1966 | Paul | 260—307 F |
| 3,281,310 | 10/1966 | Danielson | 260—307 F |
| 3,281,311 | 10/1966 | Paul | 260—307 F |
| 3,317,553 | 5/1967 | Crowther et al. | 260—307 F |
| 3,546,231 | 12/1970 | King et al. | 260—307 F X |

FOREIGN PATENTS

| 91,744 | 8/1968 | France | 260—77.5 R |

OTHER REFERENCES

Beachell et al.: Jour. Polymer Science Part B, Polymer Letters, vol. 9, No. 10, October 1971.

DONALD E. CZAJA, Primary Examiner

H. S. COCKERAM, Assistant Examiner

U.S. Cl. X.R.

204—181; 260—29.2 TN, 67 R, 67 FP, 67.6 R, 77.5 R, 307 F.